United States Patent [19]
Sakamoto et al.

[11] Patent Number: 5,561,002
[45] Date of Patent: Oct. 1, 1996

[54] ELECTRODE FOR ALKALINE STORAGE BATTERY AND METHOD OF MANUFACTURING

[75] Inventors: Takeshi Sakamoto; Takafumi Uemiya, both of Osaka; Tetsuya Nishi, Hyogo; Ayao Kariya, Hyogo; Tōru Terao, Hyogo, all of Japan

[73] Assignee: Sumitomo Electric Industries, Ltd., Osaka, Japan

[21] Appl. No.: 444,038

[22] Filed: May 18, 1995

[30] Foreign Application Priority Data

May 20, 1994 [JP] Japan .................................. 61-06535

[51] Int. Cl.$^6$ .......................... H01M 4/64; H01M 4/80; H01M 4/32
[52] U.S. Cl. .......................... 429/235; 429/223; 429/233; 429/245; 29/623.5
[58] Field of Search .................. 429/223, 233, 429/235, 245; 29/2, 623.1, 623.2, 623.3, 623.4, 623.5

[56] References Cited

U.S. PATENT DOCUMENTS

| | | | |
|---|---|---|---|
| 3,657,014 | 4/1972 | Faber | 429/234 |
| 3,951,687 | 4/1976 | Takamura et al. | 429/94 |
| 4,215,190 | 7/1980 | Ferrando et al. | 429/222 |
| 4,398,968 | 8/1983 | Koyama et al. | . |
| 5,023,155 | 6/1991 | Charkey et al. | 429/223 |

FOREIGN PATENT DOCUMENTS

| | | |
|---|---|---|
| 55-117870 | 9/1980 | Japan . |
| 57-39317 | 8/1982 | Japan . |

*Primary Examiner*—Prince Willis, Jr.
*Assistant Examiner*—Carol Chaney
*Attorney, Agent, or Firm*—W. G. Fasse; W. F. Fasse

[57] ABSTRACT

An improved electrode for an alkaline storage battery can suppress the reduction of the battery capacity when the battery is used in a high-temperature environment. The electrode is formed by charging or filling a collector, which consists of a porous body of a nickel-boron alloy containing 0.001 to 3 percent by weight of boron, with an active material. The porous body of the nickel-boron alloy can be formed by depositing nickel on a surface of a substrate consisting of a porous polymer by electroless plating with a boron compound serving as a reductant.

28 Claims, 2 Drawing Sheets

ELECTRODE FOR ALKALINE STORAGE BATTERY AND METHOD OF MANUFACTURING

BACKGROUND OF THE INVENTION

1. Field of the Invention

The present invention relates to an electrode or an alkaline storage battery and a method of manufacturing the same. More particularly, it relates to an electrode which is useful for providing an alkaline storage battery having a long life and a method of manufacturing the same.

2. Description of the Background Art

In recent years, high-capacity alkaline storage batteries, such as a nickel-cadmium battery and a nickel-hydrogen battery have been employed as power sources or various electronic devices, particularly portable devices. In such a high-capacity alkaline storage battery, a cathode is generally prepared by charging a foam metal of nickel with an active material such as nickel hydroxide, for example, in order to improve the capacity.

A foam metal is generally prepared by a technique disclosed in Japanese Patent Publication No. 57-39317 (1982), for example. According to this method, a porous body is provided with conductivity by coating a porous insulator with carbon or the like, and is then brought into close contact with a rotating feeder roll and dipped in a plating path, to be plated. The plated porous body is thereafter employed as a cathode and electroplating is performed from both surfaces, thereby forming a porous body consisting of a metal such as nickel, for example.

However, when an electrode that has been formed by charging a collector consisting of nickel with an active material is used in to an alkaline storage battery, the capacity of the battery is reduced if charge/discharge cycles are repeated under a high temperature. The cause for such a capacity reduction is not clearly understood.

SUMMARY OF THE INVENTION

An object of the present invention is to provide an electrode for an alkaline storage battery, which can suppress the reduction of the battery capacity even when the battery is used a relatively high temperature environment.

The electrode for an alkaline storage battery according to the present invention comprises a collector consisting essentially of a porous body of a nickel-boron alloy containing 0.001 to 3 percent by weight of boron, and an active material which is charged, i.e. filled or disposed, in the collector.

The collector can be prepared in any manner as long as the resulting collector has three-dimensional continuous pores in its interior, such as a spongy or felty body, for example.

The porous body serving as the collector can be formed by depositing a conductive layer on a substrate consisting essentially of a porous polymer by electroless plating. While nickel is deposited in the electroless plating, a boron compound is employed as a reductant at the time of deposition. Therefore, the method of manufacturing an electrode for an alkaline storage battery according to the present invention comprises the steps of depositing nickel on a surface of a substrate consisting essentially of a porous polymer by electroless plating while employing a boron compound as a reductant, thereby forming a porous body of a nickel-boron alloy containing 0.01 to 3 percent by weight of boron on the substrate, and charging or filling the porous body of the nickel-boron alloy with an active material.

The porous polymer for forming the substrate can be prepared from a urethane foam, or a polymer nonwoven fabric consisting of polyethylene or polypropylene, for example. The boron compound which is employed as the reductant for the electroless plating is prepared from boron hydride (borane), dimethylamine borane or the like. The substrate is dipped in a plating solution containing nickel and the boron compound reductant, and is then subjected to electroless plating. After the electroless plating, electronickeling may be carried out in order to adjust the target weight and boron concentration. Then the porous body consisting essentially of a nickel-boron alloy which is formed on the substrate is heat treated under a reducing atmosphere of hydrogen or the like, to prepare the porous body for serving as a collector.

The porous body for serving as a collector is charged or filled with an active material, in order to form an electrode. The active material is prepared from a mixture that is mainly composed of nickel hydroxide, for example. The mixture may contain other components such as 3 to 15 percent by weight of cobalt, 1 to 5 percent by weight of cobalt hydroxide, 1 to 5 percent by weight of zinc oxide and the like, for example. In addition, a binder prepared by adding polyvinyl alcohol or carboxymethyl cellulose to water may also be employed.

The electrode according to the present invention is used in an alkaline storage battery such as a nickel-cadmium battery or a nickel-hydrogen battery.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
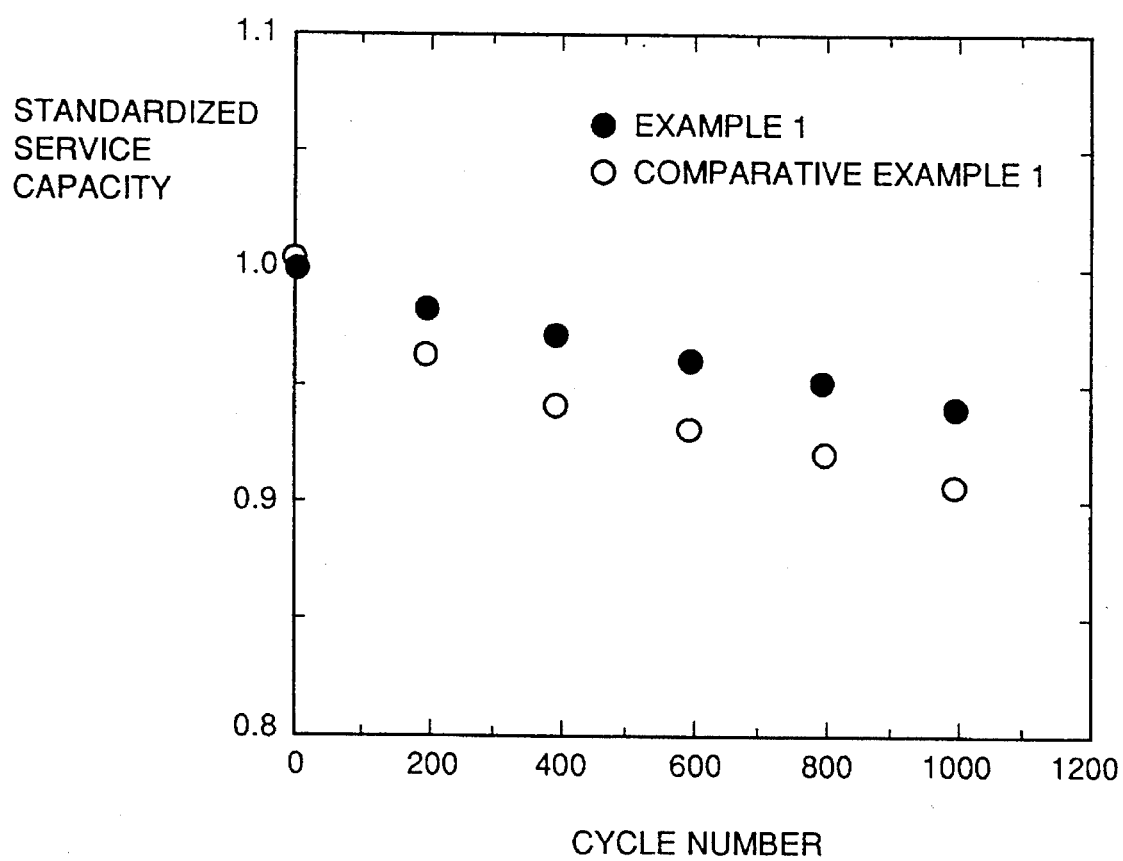
FIG. 1 illustrates the respective performance of alkaline storage batteries employing electrodes according to the present invention and alkaline storage batteries employing electrodes according to the prior art, with the axis of ordinates showing standardized battery capacities relative to the number of charge/discharge cycles as shown on the axis of abscissas.

An alkaline storage battery that uses an electrode according to the present invention does not suffer as much deterioration in capacity as does an alkaline storage battery that uses a nickel porous body as an electrode, particularly with respect to charge/discharge cycles carried out under a high temperature. This result is demonstrated by the Examples described later, although the cause for this result is not clear. According to the present invention, a nickel-boron alloy for the collector has a boron concentration of 0.001 to 3 percent by weight, more preferably 0.01 to 1 percent by weight. In this range, the inventive electrode can further suppress the deterioration of the capacity of the battery in charge/discharge cycles carried out under a high temperature as compared with a conventional electrode. If the boron concentration is out of the aforementioned range, the effect of suppressing the deterioration of the capacity is not very remarkable. In the range of 0.01 to 1 percent by weight of the boron concentration, on the other hand, the effect of suppressing the deterioration of the capacity is more remarkable. Further, a nickel alloy containing 0.001 to 3 percent by weight of boron has a low electric resistance, and has excellent collection characteristics.

Examples of the present invention will now be described, while it is noted that the present invention is not restricted to these Examples.

EXAMPLE 1

A urethane foam body 1.4 mm in thickness, 200 mm in width and 300 mm in length and having 50 continuous pores per inch was pretreated with a colloidal catalyst prepared from palladium chloride and tin chloride, and subjected to electroless plating with a nickeling solution containing boron hydride as a reductant. Then, the foam body having a nickel-boron alloy deposited on its surface was subjected to electronickeling, and thereafter heat treated under a hydrogen jet at 1000° C., thereby obtaining a spongy nickel-boron alloy porous body 580 g/m$^2$ in density. This porous body contained 0.03 percent by weight of boron. The porous body obtained in this manner was charged or filled with an active material consisting of 88 percent by weight of nickel hydroxide, 7 percent by weight of metallic cobalt, 2 percent by weight of cobalt hydroxide and 3 percent by weight of zinc oxide, to obtain a cathode for an alkaline storage battery.

Comparative Example 1

A urethane foam body identical to that employed in Example 1 was coated with carbon powder and thereafter brought into contact with a feeder roll and subjected to electronickeling, as described in Japanese Patent Publication No. 57-39317. Then, the urethane foam body with the deposited nickel thereon was heat treated under a hydrogen jet at 1000° C., thereby obtaining a spongy pure nickel porous body of 580 g/m$^2$ in density. The porous body obtained in this manner was charged with the same active material as that for Example 1, to obtain a cathode.

Other spongy pure nickel porous bodies prepared according to comparative example 1 were charged with an active material mainly composed of a hydrogen absorbing alloy consisting of $MmNi_{3.8}Mn_{0.4}Al_{0.3}CO_{0.5}$ (Mm: misch metal), to prepare anodes. These anodes were combined with the cathodes obtained in Example 1 and comparative example 1 respectively, to prepare nickel-hydrogen batteries of 22.5 mm in diameter and 49.2 mm in height with separators consisting of sulfonated polypropylene nonwoven fabric and an electrolyte of aqueous potassium hydroxide having a specific gravity of 1.2. Charge/discharge cycle tests at 1C rate were carried out at 45° C. on the two types of batteries employing the respective cathodes, to examine changes in the thereof capacity. FIG. 1 shows the results. Referring to FIG. 1, the capacities are standardized with reference to initial capacities of 1.0. It is clearly understood from FIG. 1 that the battery comprising the electrode employing the nickel-boron alloy porous body of Example 1 according to the invention is less deteriorated in capacity than the battery with the electrode of the Comparative Example 1.

EXAMPLE 2

A nickel-boron alloy porous body was prepared in a similar manner to Example 1, except that the amount of deposition by electroless plating was changed. The plating was so carried out that the porous body exhibited a boron concentration of 0.001 percent by weight. Thereafter a cathode was prepared similarly to Example 1.

EXAMPLE 3

A nickel-boron alloy porous body was prepared in a similar manner to Example 1, except for the amount of deposition by electroless plating. The plating was so carried out that the porous body exhibited a boron concentration of 0.01 percent by weight. Thereafter a cathode was prepared similarly to Example 1.

EXAMPLE 4

A nickel-boron alloy porous body was prepared in a similar manner to Example 1, except for the amount of deposition by electroless plating. The plating was so carried out that the porous body exhibited a boron concentration of 1 percent by weight. Thereafter a cathode was prepared similarly to Example 1.

EXAMPLE 5

A nickel-boron alloy porous body was prepared in a similar manner to Example 1, except for the amount of deposition by electroless plating. The plating was so carried out that the porous body exhibited a boron concentration of 3 percent by weight. The porous body was employed to prepare a cathode similarly to Example 1.

Comparative Example 2

Plating was carried out in a similar manner as Example 1 to attain a boron concentration of 0.0001%, thereby forming a nickel-boron alloy porous body. A cathode was prepared from this porous body in the same manner as Example 1.

Comparative Example 3

Plating was carried out in a similar manner to Example 1 to attain a boron concentration of 5%, thereby forming a nickel-boron alloy porous body. A cathode was prepared from this porous body in a similar manner to Example 1.

Figure 2:
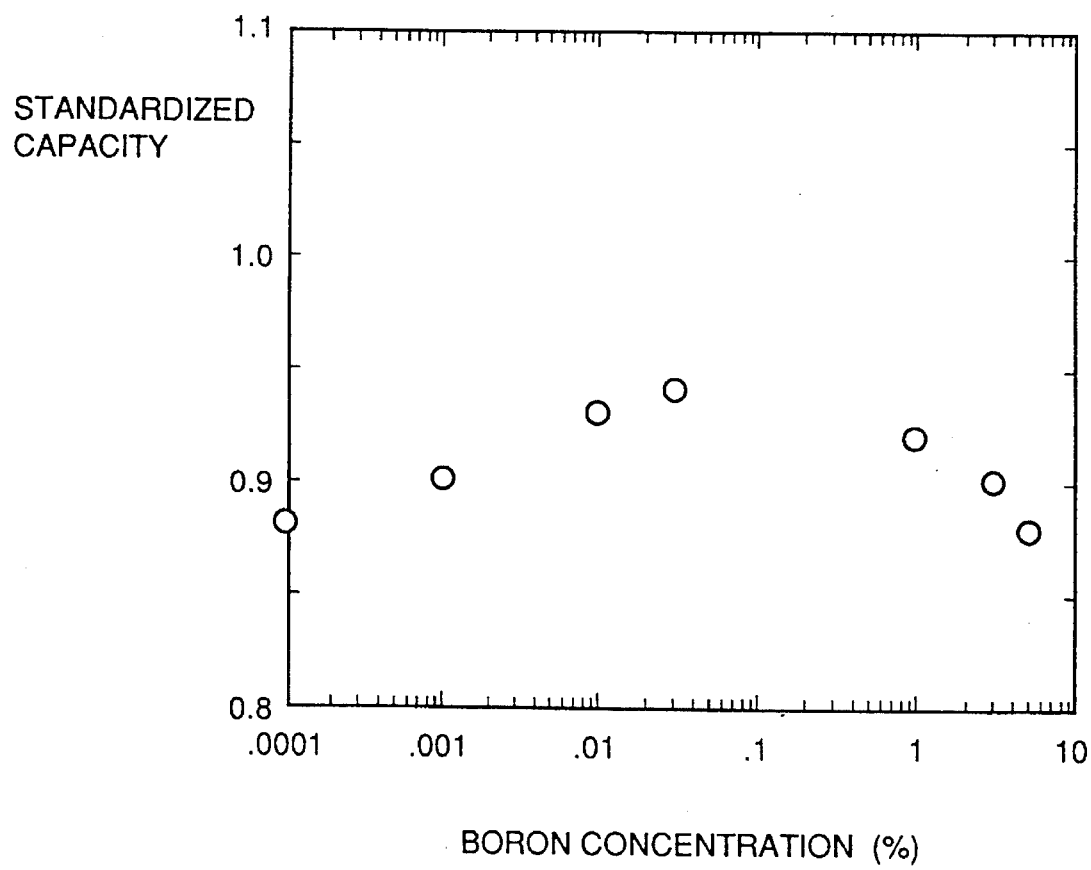
FIG. 2 illustrates the respective performance of seven types of alkaline storage batteries respectively comprising electrodes employing seven types of nickel-boron alloy porous bodies having different boron concentrations.

The cathodes of Examples 1 to 5 employing the nickel-boron alloy porous bodies having boron concentrations of 0.03, 0.001, 0.01, 1 and 3 percent by weight respectively and those of comparative examples 2 and 3 employing the nickel-boron alloy porous bodies having boron concentrations of 0.0001 and 5 percent by weight respectively were employed to prepare nickel-hydrogen batteries, similarly to the above. Charge/discharge cycle tests at 1C rate were carried out at 45° C. as to the seven types batteries obtained in the aforementioned manner, to examine changes in the thereof capacity. FIG. 2 shows battery capacities after 600 charge/discharge cycles, which were standardized with reference to initial capacities of 1.0. Referring to FIG. 2, the batteries employing the nickel-boron alloy porous bodies having boron concentrations of 0.001 to 3 percent by weight exhibit standardized capacities exceeding that of comparative example 1. In the boron concentration range of 0.1 to 1 percent by weight, the capacity deterioration is further remarkably suppressed as compared with that of comparative example 1.

Further, polyester nonwoven fabric members 20 μm in fiber diameter and 1.5 mm in thickness were employed in place of the urethane foam bodies to prepare nickel-hydrogen batteries similarly to Examples 1 to 5 and comparative example 1. These batteries were evaluated similarly to the above, and obtained results similar to those shown in FIGS. 1 and 2.

EXAMPLE 6

A nickel-boron alloy porous body was prepared in a similar manner to Example 1, except that dimethylamine borane was used as the reductant in place of boron hydride. The plating was so carried out that the porous body exhibited a boron concentration of 0.03 percent by weight. A cathode was prepared from the obtained porous body in a similar manner to Example 1 and then a nickel-hydrogen battery was prepared similarly to the above. One charge/discharge cycle (1C) at 45° C. was repeated 600 times to examine the capacity change of the obtained battery. After the 600 cycles, the final capacity of the battery was about 96% of the initial capacity, which is a result similar to that of Example 1.

As hereinabove described, the inventive electrode for an alkaline storage battery employing a porous body of a nickel-boron alloy can suppress the capacity deterioration of the battery particularly when charge/discharge cycles are carried out under a high temperature. Thus, the inventive electron can increase the life of the battery. Further, an electrode for an alkaline storage battery having the aforementioned performance can readily be manufactured by carrying out electroless nickeling with a boron compound serving as a reductant in accordance with the present invention.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electrode for an alkaline storage battery, comprising:
    a collector consisting essentially of a porous body of a nickel-boron alloy containing 0.001 to 3 percent by weight of boron; and
    an active material disposed on pones of said collection.
2. The electrode for an alkaline storage battery in accordance with claim 1, wherein said nickel-boron alloy contains 0.01 to 1 percent by weight of boron.
3. The electrode for an alkaline storage battery in accordance with claim 1, wherein said active material is mainly composed of nickel hydroxide.
4. The electrode for an alkaline storage battery in accordance with claim 2, wherein said active material is mainly composed of nickel hydroxide.
5. In a nickel-hydrogen battery, an improved cathode electrode comprising: a collector consisting essentially of a porous body of a nickel-boron alloy containing 0.001 to 3 percent by weight of boron; and an active material disposed in pores of said collector.
6. In the nickel-hydrogen battery of claim 4, the improved cathode electrode wherein said nickel-boron alloy contains 0.01 to 1 percent by weight of boron.
7. In the nickel-hydrogen battery of claim 4, the improved cathode electrode wherein said active material is mainly composed of nickel hydroxide.
8. In a nickel-cadmium battery, an improved cathode electrode comprising: a collector consisting essentially of a porous body of a nickel-boron alloy containing 0.001 to 3 percent by weight of boron; and an active material disposed in pores of said collector.
9. In the nickel-cadmium battery of claim 5, the improved cathode electrode wherein said nickel-boron alloy contains 0.01 to 1 percent by weight of boron.
10. In the nickel-cadmium battery of claim 5, the improved cathode electrode wherein said active material is mainly composed of nickel hydroxide.
11. A method of manufacturing an electrode for an alkaline storage battery, comprising the steps of:
    depositing nickel on a surface of a substrate consisting essentially of a porous polymer by electroless plating employing a boron compound as a reductant, to form a porous body of a nickel-boron alloy containing 0.001 to 3 percent by weight of boron on said substrate; and
    filling an active material into pores of said porous body of said nickel-boron alloy.
12. The method of manufacturing an electrode for an alkaline storage battery in accordance with claim 11, wherein said boron compound includes boron hydride.
13. The method of manufacturing an electrode for an alkaline storage battery in accordance with claim 12, wherein said porous polymer is a polymer nonwoven fabric.
14. The method of manufacturing an electrode for an alkaline storage battery in accordance with claim 12, wherein said porous polymer is a urethane foam.
15. The method of manufacturing an electrode for an alkaline storage battery in accordance with claim 12, wherein said step of forming said porous body further comprises a step of performing electronickeling after said electroless plating.
16. The method of manufacturing an electrode for an alkaline storage battery in accordance with claim 12, wherein said step of forming said porous body further comprises a step of heat treating said substrate and said porous body under a reducing atmosphere.
17. The method of manufacturing an electrode for an alkaline storage battery in accordance with claim 11, wherein said boron compound includes dimethylamine borane.
18. The method of manufacturing an electrode for an alkaline storage battery in accordance with claim 17, wherein said step of forming said porous body further comprises a step of performing electronickeling after said electroless plating.
19. The method of manufacturing an electrode for an alkaline storage battery in accordance with claim 17, wherein said step of forming said porous body further comprises a step of heat treating said substrate and said porous body under a reducing atmosphere.
20. The method of manufacturing an electrode for an alkaline storage battery in accordance with claim 11, wherein said porous polymer is a polymer nonwoven fabric.
21. The method of manufacturing an electrode for an alkaline storage battery in accordance with claim 20, wherein said step of forming said porous body further comprises a step of performing electronickeling after said electroless plating.
22. The method of manufacturing an electrode for an alkaline storage battery in accordance with claim 20, wherein said step of forming said porous body further comprises a step of heat treating said substrate and said porous body under a reducing atmosphere.
23. The method of manufacturing an electrode for an alkaline storage battery in accordance with claim 11, wherein said porous polymer is a urethane foam.
24. The method of manufacturing an electrode for an alkaline storage battery in accordance with claim 23, wherein said step of forming said porous body further comprises a step of performing electronickeling after said electroless plating.

25. The method of manufacturing an electrode for an alkaline storage battery in accordance with claim 23, wherein said step of forming said porous body further comprises a step of heat treating said substrate and said porous body under a reducing atmosphere.

26. The method of manufacturing an electrode for an alkaline storage battery in accordance with claim 11, wherein said step of forming said porous body further comprises a step of performing electronickeling after said electroless plating.

27. The method of manufacturing an electrode for an alkaline storage battery in accordance with claim 26, wherein said step of forming said porous body further comprises a step of heat treating said substrate and said porous body under a reducing atmosphere.

28. The method of manufacturing an electrode for an alkaline storage battery in accordance with claim 11, wherein said step of forming said porous body further comprises a step of heat treating said substrate and said porous body under a reducing atmosphere.

* * * * *

UNITED STATES PATENT AND TRADEMARK OFFICE
CERTIFICATE OF CORRECTION

PATENT NO. : 5,561,002

DATED : October 1, 1996

INVENTOR(S) : Sakamoto et al.

It is certified that error appears in the above-identified patent and that said Letters Patent is hereby corrected as shown below:

On the title page, item
[54] line 3, after "MANUFACTURING" insert --THE SAME--.

Col. 1, line 3, after "MANUFACTURING" insert --THE SAME--;
     line 8, replace "or" by --for--;
     line 16, replace "or" by --for--;
     line 34, delete "to";
     line 44, after "used" insert --in--.

Col. 3, line 45, replace "$CO_{0.5}$" by --$Co_{0.5}$--;
     line 48, delete "of";
     line 55, replace "thereof capacity" by --capacity thereof--.

Col. 4, line 53, replace "thereof capacity" by --capacity thereof--.

Col. 5, line 15, replace "capacity change" by --change in capacity--;
     line 23, replace "electron" by --electrode--.

Claim 1, col. 5, line 42, replace "on pones" by --in pores--, replace "collection" by --collector--.

Signed and Sealed this

Thirty-first Day of December, 1996

*Attest:*

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,561,002
DATED : Oct. 1, 1996
INVENTOR(S) : Sakamoto et al.

It is certified that error appears in the above-identified patent and that said Letters Patent is hereby corrected as shown below:

On the title page under [30] Foreign Application Priority Data, please replace "Japan .... 61-06535" by --Japan .... 6-106535--.

Signed and Sealed this

Second Day of December, 1997

Attest:

BRUCE LEHMAN

Attesting Officer

Commissioner of Patents and Trademarks